(12) United States Patent
Shimamura

(10) Patent No.: US 11,861,433 B2
(45) Date of Patent: Jan. 2, 2024

(54) IMAGE FORMING APPARATUS HAVING SCANNING OPTICAL SYSTEM TO FORM ON PHOTOSENSITIVE MEMBER N BEAM SPOTS SEPARATED BY M SCAN LINES

(71) Applicant: BROTHER KOGYO KABUSHIKI KAISHA, Nagoya (JP)

(72) Inventor: Yasuhiro Shimamura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/809,304

(22) Filed: Jun. 28, 2022

(65) Prior Publication Data

US 2023/0029672 A1 Feb. 2, 2023

(30) Foreign Application Priority Data

Jul. 30, 2021 (JP) ................................. 2021-125303

(51) Int. Cl.
*G06K 15/02* (2006.01)
*G06K 15/12* (2006.01)
*G03G 15/00* (2006.01)

(52) U.S. Cl.
CPC ......... *G06K 15/1898* (2013.01); *G03G 15/50* (2013.01); *G06K 15/1228* (2013.01); *G06K 15/1817* (2013.01); *G06K 15/1896* (2013.01)

(58) Field of Classification Search
CPC ................................................. G06K 15/1898
USPC ......................................................... 358/1.17
See application file for complete search history.

(56) References Cited

U.S. PATENT DOCUMENTS

2012/0050827 A1* 3/2012 Taniguchi .............. H04N 1/506
358/505

FOREIGN PATENT DOCUMENTS

| JP | 3-257469 A | 11/1991 |
| JP | 11-34402 A | 2/1999 |
| JP | 2003-312041 A | 11/2003 |

* cited by examiner

*Primary Examiner* — Jacky X Zheng
(74) *Attorney, Agent, or Firm* — Merchant & Gould P.C.

(57) ABSTRACT

In an image forming apparatus, a scanning optical system forms on a photosensitive member N beam spots. Each beam spot scans along a scan line on the photosensitive member for one cycle. A center-to-center distance of any neighboring two beam spots is separated by M scan lines. M is a natural number larger than or equal to two. For each cycle, the memory controller reads adjacent sets of line data for N scan lines from the page memory, writes the adjacent sets of line data for N scan lines to the storage areas identified by a plurality of successive addresses of the line memory, selects addresses identifying storage areas storing unadjacent sets of line data having non-successive two scan lines separated by M scan lines; and outputs the unadjacent sets of line data stored in the storage areas identified by the selected addresses to the N laser emitting members.

7 Claims, 8 Drawing Sheets

FIG. 7

| | FIRST SCAN | | SECOND SCAN | | THIRD SCAN | | FOURTH SCAN | | FIFTH SCAN | | SIXTH SCAN | |
|---|---|---|---|---|---|---|---|---|---|---|---|---|
| A1 | | | | | | | | | | | | |
| A2 | R1 | | R2 | | | | | | | | | |
| A3 | W1 | | | | | | | | | | | |
| A4 | W1 | | | | | | | | | | | |
| A5 | | | | W2 | | | | | | | | |
| A6 | | | R2 | W2 | | | | | | | | |
| A7 | | | | | W3 | R3 | | | | | | |
| A8 | | | | | W3 | R3 | | R4 | | | | |
| A9 | | | | | | | W4 | R4 | | | | |
| A10 | | | | | | | W4 | | | R5 | | |
| A11 | R1 | | | | | | | | W5 | R5 | | R6 |
| A12 | | | | | | | | | W5 | | W6 | R6 |
| | | | | | | | | | | | W6 | |

FIG. 8

| | FIRST SCAN | | SECOND SCAN | | THIRD SCAN | | FOURTH SCAN | |
|---|---|---|---|---|---|---|---|---|
| A1 | | | | R2 | | | W4 | |
| A2 | | | | R2 | | | W4 | |
| A3 | | R1 | | | | | W4 | |
| A4 | | R1 | | | | | W4 | |
| A5 | W1 | | | | | R3 | | |
| A6 | W1 | | | | | R3 | | |
| A7 | W1 | | | R2 | | | | |
| A8 | W1 | | | R2 | | | | |
| A9 | | | W2 | | | | | R4 |
| A10 | | | W2 | | | | | R4 |
| A11 | | | W2 | | | R3 | | |
| A12 | | | W2 | | | R3 | | |
| A13 | | R1 | | | W3 | | | |
| A14 | | R1 | | | W3 | | | |
| A15 | | | | | W3 | | | R4 |
| A16 | | | | | W3 | | | R4 |

FIG. 9

| | First Scan | | Second Scan | | Third Scan | | Fourth Scan | | Fifth Scan | | Sixth Scan | | Seventh Scan | | Eighth Scan | |
|---|---|---|---|---|---|---|---|---|---|---|---|---|---|---|---|---|
| A1 | W1 | W1 | | | | | | | | | | | | | R8 | |
| A2 | W1 | W1 | | | | | | | | | | | | | R8 | |
| A3 | | | W2 | W2 | | | | | | | | | | | | |
| A4 | R1 | | W2 | W2 | R3 | | R4 | | | | | | | | | |
| A5 | R1 | | | | R3 | | R4 | | R5 | | | | | | | |
| A6 | R1 | | | | R3 | | R4 | | R5 | | R6 | | W7 | | W8 | |
| A7 | R1 | | | W3 | | | | | R5 | | R6 | | W7 | | W8 | |
| A8 | R1 | | | W3 | | W4 | R4 | | R5 | | R6 | | R7 | | | |
| A9 | R1 | | R2 | | | W4 | R4 | | R5 | | R6 | | R7 | | R8 | |
| A10 | | | R2 | | R3 | | | | W5 | | R6 | | R7 | | R8 | |
| A11 | | | R2 | | R3 | | R4 | | W5 | | | | R7 | | R8 | |

# IMAGE FORMING APPARATUS HAVING SCANNING OPTICAL SYSTEM TO FORM ON PHOTOSENSITIVE MEMBER N BEAM SPOTS SEPARATED BY M SCAN LINES

REFERENCE TO RELATED APPLICATIONS

This application claims priority from Japanese Patent Application No. 2021-125303 filed on Jul. 30, 2021. The entire content of the priority application is incorporated herein by reference.

BACKGROUND ART

One conventional image forming device scans a plurality of beams in a single scan. To scan a plurality of beams in a single scan, the image forming device stores image signals in a line buffer for a plurality of scan lines within one cycle of a horizontal synchronizing signal. The conventional image forming device then outputs the signals from the line buffer to scan a plurality of scan lines over a photosensitive member in a single scan.

DESCRIPTION

While the conventional image forming device described above scans a plurality of beams for neighboring scan lines, the device is not envisioned to perform interlaced scanning in which the beams are scanned at positions separated from each other by a distance of one or more scan lines. In a conceivable case that interlaced scanning is to be performed on the image forming device described above, the order of raster image data stored in the page memory would not match the order of data for exposing the photosensitive member. Then, if the device were configured to read data from the page memory in accordance with the order of the exposure data, memory accesses on the device would become more complicated.

In view of the foregoing, it is an object of the present disclosure to provide an image forming device capable of efficiently exposing a photosensitive member in a single scan based on two or more scan lines worth of line data when performing interlaced scanning.

In order to attain the above and other object, the present disclosure provides an image forming apparatus. The image forming apparatus includes a photosensitive member, N laser emitting members, an incident optical system, a deflector, a scanning optical system, an optical sensor, a page memory, a line memory, and a memory controller. The N laser emitting members. N is a natural number larger than or equal to two. The incident optical system is configured to convert light emitted from each laser emitting member to a beam. The deflector is configured to deflect and cyclically scan each beam from the incident optical system. The scanning optical system is configured to form on the photosensitive member N beam spots by N beams deflected by the deflector, each beam spot scanning along a scan line on the photosensitive member to form a beam image along the scan line for one cycle, any neighboring two beam spots in the N beam spots having centers with a center-to-center distance of the neighboring two beam spots separated by M scan lines. M is a natural number larger than or equal to two. The optical sensor is configured to detect a beam which is deflected and scanned by the deflector to output a detection signal for each cycle. The page memory is configured to store raster image data including a plurality of line data. The line memory is configured to store the line data read from the page memory, the line memory having storage areas and addresses identifying respective ones of storage areas. The memory controller is configured to perform: for each cycle based on the detection signal outputted from the optical sensor, reading adjacent sets of line data for N scan lines from the page memory, the adjacent sets of line data for N scan line successively arranged on the photosensitive member; writing the adjacent sets of line data for N scan lines to the storage areas identified by a plurality of successive addresses among the addresses of the line memory; selecting addresses identifying storage areas storing unadjacent sets of line data having non-successive two scan lines separated by M scan lines on the photosensitive member; and outputting the unadjacent sets of line data stored in the storage areas identified by the selected addresses to the N laser emitting members.

According to another aspect, the disclosure provides an image forming apparatus. The image forming apparatus includes a photosensitive drum, a semiconductor laser, an incident optical system, a polygon mirror, a scanning optical system, an optical sensor, a page memory, a line memory, and a memory controller. The semiconductor laser has N laser emitters. N is a natural number larger than or equal to two. The incident optical system is configured to convert light emitted from each laser emitter to a beam. The polygon mirror is configured to deflect and cyclically scan each beam from the incident optical system. The scanning optical system is configured to form on the photosensitive drum N beam spots by N beams deflected by the polygon mirror. Each beam spot scanning along a scan line on the photosensitive member to form a beam image along the scan line for one cycle, any neighboring two beam spots in the N beam spots having centers with a center-to-center distance of the neighboring two beam spots separated by M scan lines. M being a natural number larger than or equal to two. The optical sensor is configured to detect a beam which is deflected to output a detection signal for each cycle. The page memory is configured to store raster image data including a plurality of line data. The line memory is configured to store the line data read from the page memory, the line memory having storage areas and addresses identifying respective ones of storage areas. The memory controller is configured to perform: for each cycle based on the detection signal outputted from the optical sensor, reading adjacent sets of line data for scan lines from the page memory, the adjacent sets of line data for scan line successively arranged on the photosensitive drum; writing the adjacent sets of line data for scan lines to the storage areas identified by a plurality of successive addresses among the addresses of the line memory; selecting addresses identifying storage areas storing unadjacent sets of line data for N scan lines having non-successive two scan lines separated by M scan lines on the photosensitive member; and outputting the unadjacent sets of line data stored in the storage areas identified by the selected addresses to the N laser emitters.

FIG. 7 is an explanatory diagram illustrating a process performed by a memory controller provided in the ASIC shown in FIG. 6.

FIG. 8 is an explanatory diagram illustrating a process performed by the memory controller.

FIG. 9 is an explanatory diagram illustrating a process performed by the memory controller.

Hereinafter, one embodiment of the present disclosure will be described while referring to the accompanying drawings.

First Embodiment

Structure of an Image forming Device 1

Figure 1:
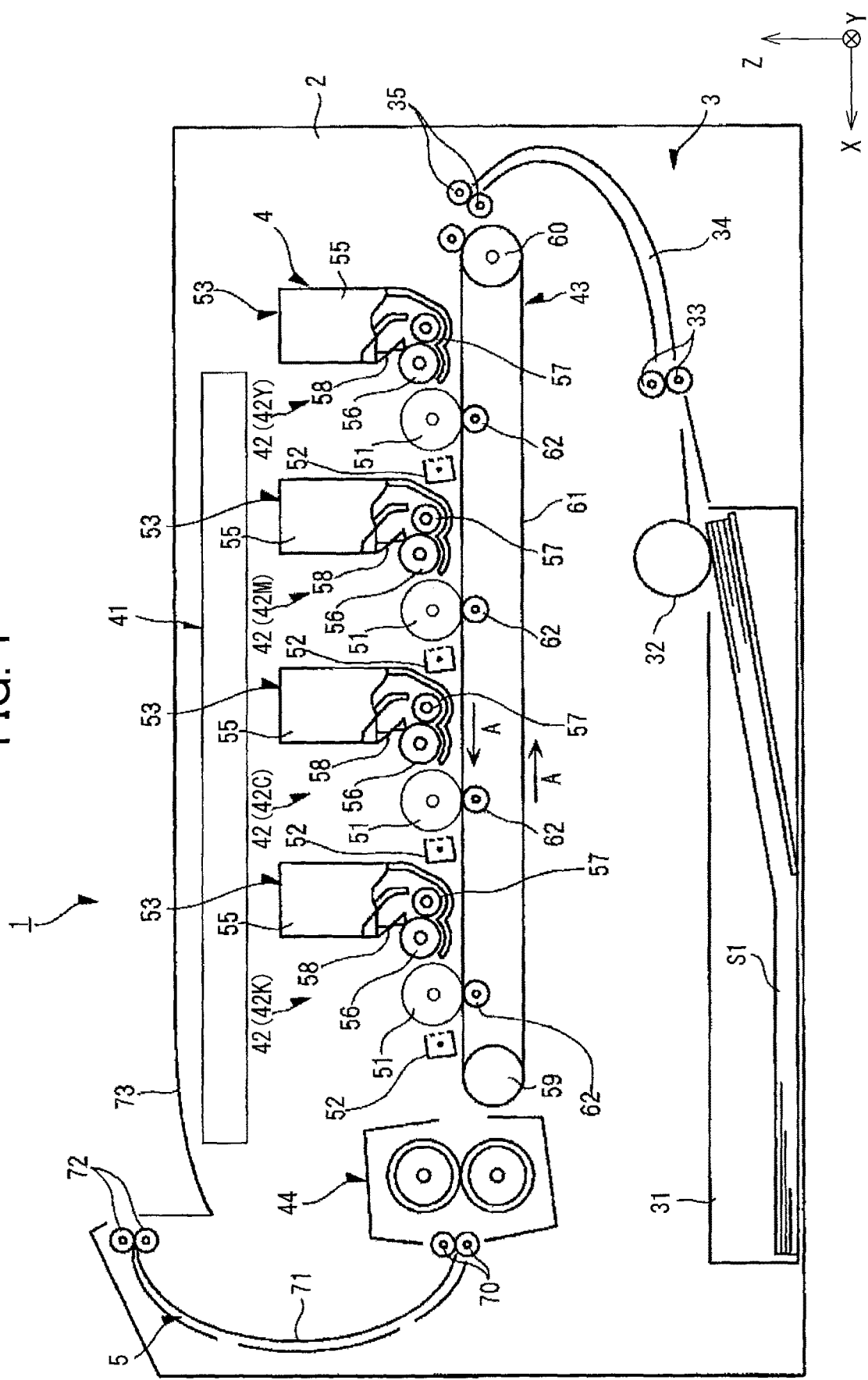
FIG. 1 is a side cross-sectional view showing a structure of an image forming device.

FIG. 1 is a side cross-sectional view showing the structure of an image forming device 1 according to a first embodiment of the present disclosure. In FIG. 1, the direction in which process members 42 are aligned will be called an X-axis direction, the direction from a sheet-feeding member 3 toward an image forming member 4 will be called the positive direction on a Z-axis, and a direction orthogonal to the X-axis direction and the Z-axis direction will be called a Y-axis direction.

In this example, the image forming device 1 is a horizontal tandem color laser printer having a plurality of process members 42 juxtaposed in the X-axis direction. The image forming device 1 is also configured to scan a plurality of beams for neighboring scan lines on a photosensitive member 51 and performs interlaced scanning in which the beams are scanned at positions separated from each other by one or more scan lines. The scan lines are juxtaposed in a sub scanning direction, which is the same direction in which sheets S1 are conveyed. As shown in FIG. 1, the image forming device 1 is provided with a main casing 2, a sheet-feeding member 3, an image forming member 4, and a discharging member 5.

The main casing 2 accommodates the sheet-feeding member 3, the image forming member 4, and the discharging member 5. The sheet-feeding member 3 feeds sheets S1 and is provided with a sheet cassette 31, a feed roller 32, conveying rollers 33, a feeding path 34, and registration rollers 35. The sheet cassette 31 is disposed in the bottom section of the main casing 2. Sheets S1 are stacked in the sheet cassette 31.

The feed roller 32 is disposed above the sheet cassette 31 for conveying sheets S1 stacked in the sheet cassette 31 to the conveying rollers 33. The conveying rollers 33 convey sheets S1 fed by the feed roller 32 onto the feeding path 34. The upstream end of the feeding path 34 is adjacent to the conveying rollers 33, while the downstream end of the feeding path 34 is adjacent to the registration rollers 35. The feeding path 34 configures a conveying path for conveying sheets S1 from the conveying rollers 33 to the registration rollers 35.

The image forming member 4 forms images on sheets S1 that have been supplied by the sheet-feeding member 3. The image forming member 4 is provided with a scanning optical device 41, the process members 42, a transfer member 43, and a fixing member 44. The image forming member 4 will be described later in detail.

Structure of the Scanning Optical Device 41

Figure 2:
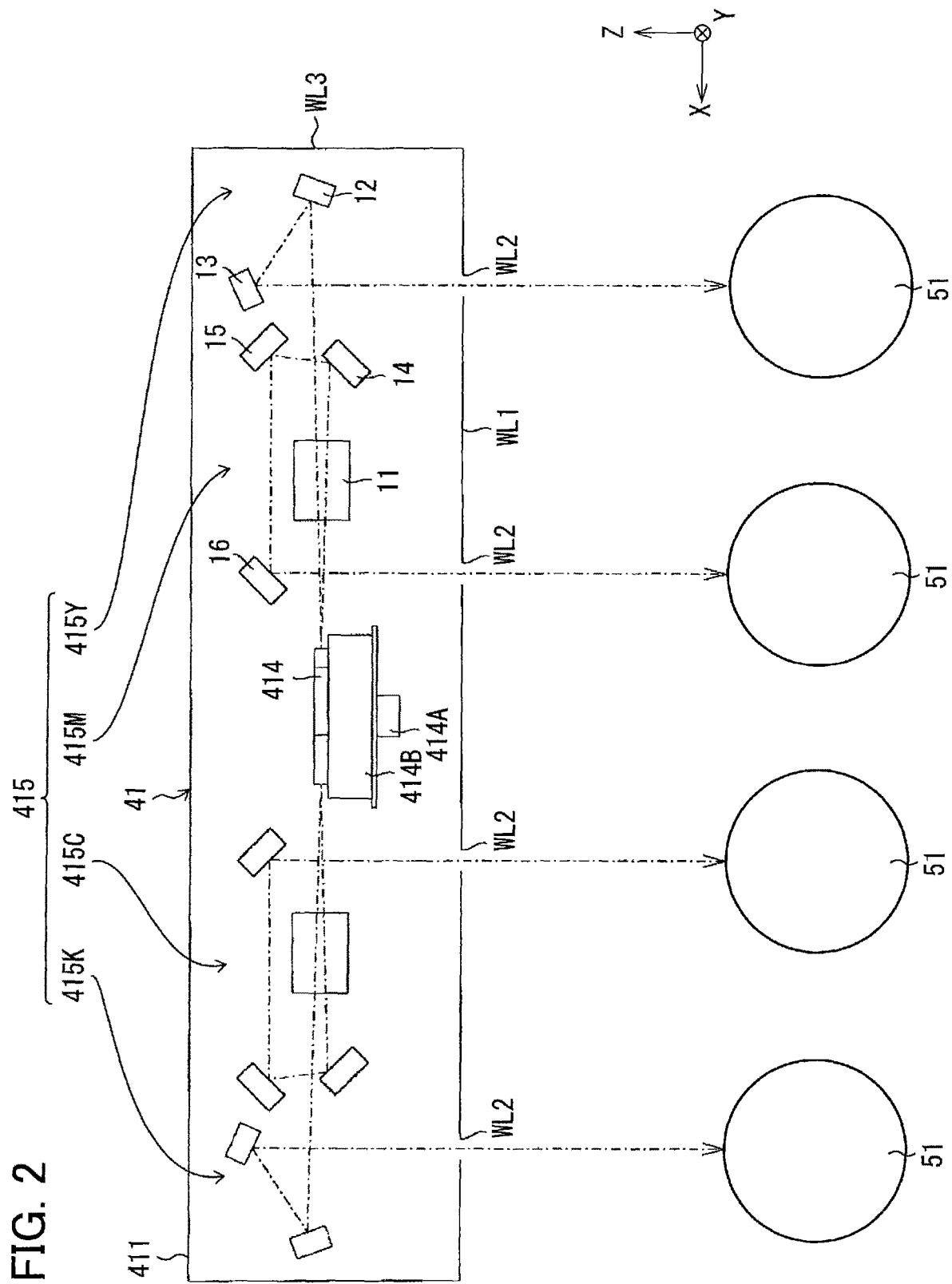
FIG. 2 is a cross-sectional view in a positive direction of a Y-axis showing a scanning optical device provided in the image forming device shown in FIG. 1.
Figure 3:
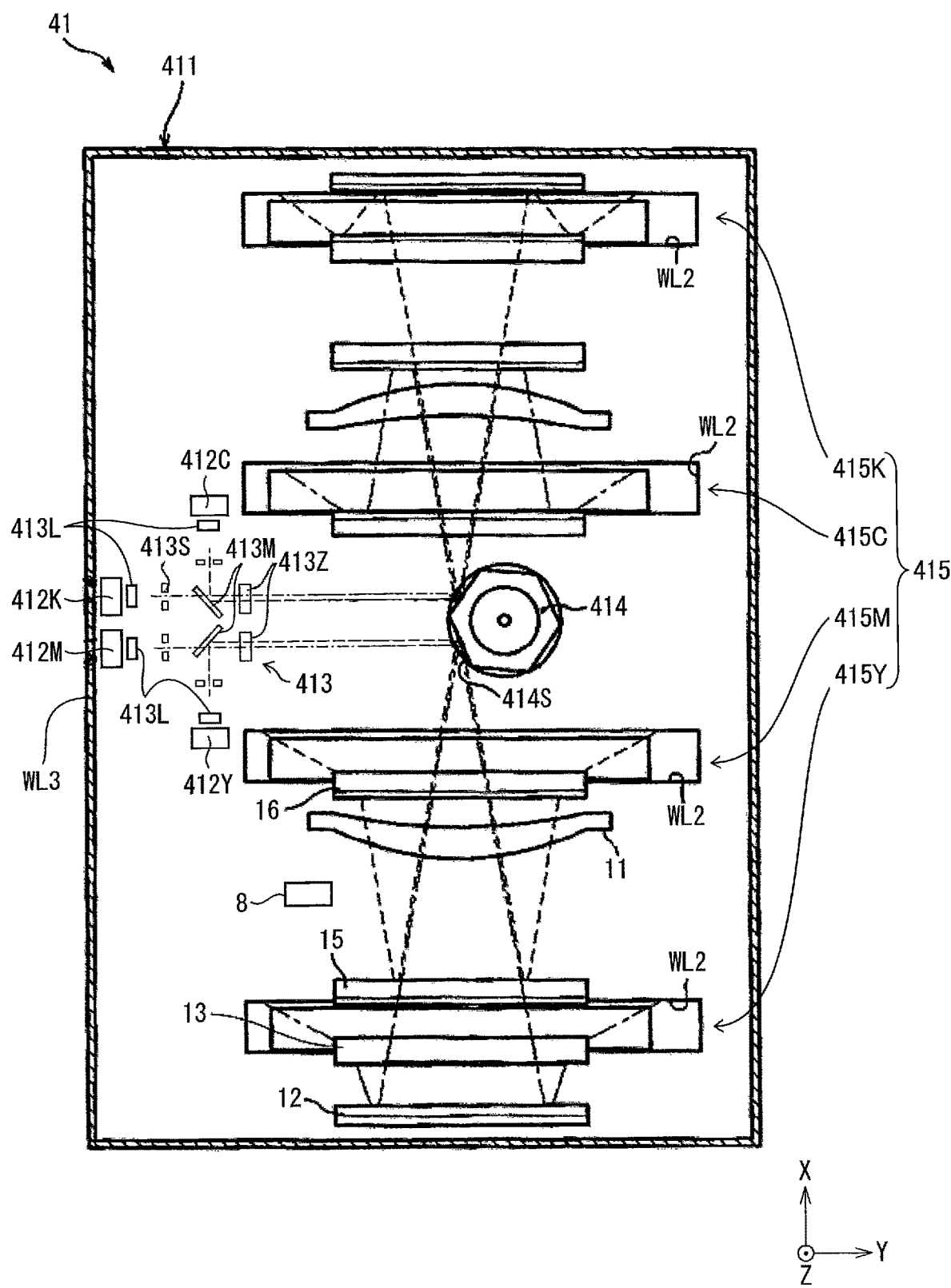
FIG. 3 is a view in a negative direction of a Z-axis showing the scanning optical device shown in FIG. 2.
Figure 4:
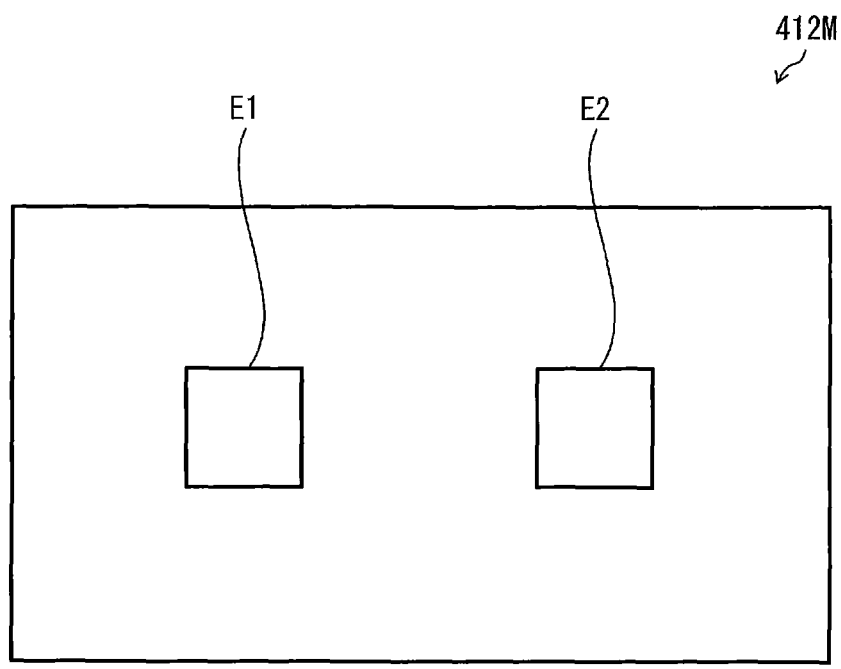
FIG. 4 is an explanatory diagram illustrating a structure of a semiconductor laser provided in the scanning optical device shown in FIG. 3.

The scanning optical device 41 is disposed in the upper section of the main casing 2 over the process members 42. FIG. 2 is a cross-sectional view in the positive direction of the Y-axis showing the scanning optical device 41 provided in the image forming device 1 of FIG. 1. FIG. 3 is a view in the negative direction of the Z-axis showing the scanning optical device 41 depicted in FIG. 2. FIG. 4 shows the structure of a semiconductor laser 412M provided in the scanning optical device 41 depicted in FIG. 3.

As shown in FIGS. 2 and 3, the scanning optical device 41 is provided with a frame 411; semiconductor lasers 412M, 412K, 412Y, and 412C; an incident optical system 413; a polygon mirror 414 as an example of the deflector; scanning optical systems 415; and a beam detect (BD) sensor 8 as an example of the optical sensor. Each of the semiconductor lasers 412M, 412K, 412Y, and 412C is provided with N laser light-emitting members (where N is a natural number of 2 or greater). As shown in FIG. 4, the semiconductor laser 412M has two laser light-emitting members E1 and E2 (i.e., N=2), for example.

The frame 411 is box-shaped and open on the positive side of the Z-axis. The frame 411 is formed of a resin. The frame 411 retains the polygon mirror 414; the semiconductor lasers 412M, 412K, 412Y, and 412C; the incident optical system 413; and the scanning optical systems 415. As shown in FIG. 2, the frame 411 is provided with a bottom wall WL1, and side walls WL3 extending in the positive direction of the Z-axis from the peripheral edges on all four sides of the bottom wall WL1. An exit window WL2 is formed in the bottom wall WL1 for each color. The exit windows WL2 are spaced apart from each other in the X-axis direction.

The polygon mirror 414 is disposed on a motor board 414B in the approximate center of the frame 411. The polygon mirror 414 deflects the beam emitted from the incident optical system 413. The incident optical system 413 will be described later. The polygon mirror 414 has a polyhedral shape with a plurality of beam deflecting surfaces 414S. The polygon mirror 414 is driven to rotate at a high speed by the drive force of a scanner motor disposed on the motor board 414B. The polygon mirror 414 rotates about a rotational shaft 414A provided in the center of the polygon mirror 414.

As shown in FIG. 3, the semiconductor lasers 412M and 412K are aligned in the X-axis direction. The semiconductor lasers 412C and 412Y are spaced apart but face each other in the X-axis direction. The semiconductor lasers 412M and 412K emits light toward the positive direction of the Y axis. Light emitted from the semiconductor laser 412M travels in a direction substantially orthogonal to light emitted from the semiconductor laser 412Y, and light emitted from the semiconductor laser 412K travels in a direction substantially orthogonal to light emitted from the semiconductor laser 412C.

The incident optical system 413 is provided with four coupling lenses 413L, four slitted plates 413S, two reflective mirrors 413M, and two cylindrical lenses 413Z. The coupling lenses 413L convert light emitted from the laser light-emitting members of the corresponding semiconductor lasers 412M, 412K, 412Y, and 412C into beams.

The slitted plates 413S are arranged opposite the respective coupling lenses 413L. Widths of beams exiting the coupling lenses 413L are regulated by slits formed in the corresponding slitted plates 413S.

One of the two reflective mirrors 413M is arranged at a slope of approximately 45° relative to the flat plates configuring the substantially L-shaped slitted plate 413S that is disposed in opposition to the semiconductor laser 412Y. This reflective mirror 413M is shaped to reflect light emitted from the semiconductor laser 412Y at an angle of approximately 90°. The reflective mirror 413M is offset in the Z-axis direction from the path of light emitted from the semiconductor laser 412M so that light emitted from the semiconductor laser 412M is not reflected by this reflective mirror 413M.

The other reflective mirror 413M is arranged so as to slope approximately 45° relative to the flat plates configuring the substantially L-shaped slitted plate 413S that is disposed in opposition to the semiconductor laser 412C. This other reflective mirror 413M is shaped to reflect light emitted from the semiconductor laser 412C at an angle of approximately 90°. This reflective mirror 413M is also offset in the Z-axis direction from the path of light emitted from the semiconductor laser 412K so that light emitted from the semiconductor laser 412K is not reflected by this reflective mirror 413M.

The cylindrical lenses 413Z are formed of a resin material through injection molding. The cylindrical lenses 413Z are arranged to confront slitted plates 413S with a gap of a prescribed distance. The surfaces of the cylindrical lenses 413Z that face the slitted plates 413S are cylindrical incidence surfaces on which beams passing through the slitted plates 413S are incident.

The surfaces of the cylindrical lenses 413Z facing the polygon mirror 414 are flat exit surfaces from which light incident on the incidence surfaces exits. By rotating at a high speed, the polygon mirror 414 deflects beams passing through the cylindrical lenses 413Z.

The scanning optical systems 415 form, by the N beams deflected by the polygon mirror 414, N beam spots (N spot images) on the photosensitive member 51 at positions separated by M scan lines (where M is a natural number larger than or equal to 2). In this example, N is 2, and light emitted from the N (=2) laser light-emitting members E1 and E2 (FIG. 4) of the semiconductor laser 412M is converted to N beams by the coupling lenses 413L, and these N beams are deflected by the polygon mirror 414. That is, as shown FIG. 5, scan lines S11-S16 are arranged at regular intervals Pi, a center of each beam spots scans along a scan line on the photosensitive member 51, and a distance between centers of N (=2) beam spots is M×Pi. In other words, the regular interval Pi is a distance between two successive scan lines. In the present description, expressions such as "the things separated by M scan lines" may indicate the things shifted by M scan lines. More specifically, expressions such as "the things separated by M scan lines" may indicate a center-to-center distance of the things equal to the distance M×Pi when the things have a size such as a beam spot in the sub scanning direction, or a distance of the things equal to the distance M×Pi when the things have no size in the sub scanning direction such as scan lines which have no size in the sub scanning direction. In a case that N is 3 or more, any closest two beam spots among N beam spots on the photosensitive member 51 may be separated by M scan lines (a distance M×Pi). That is, a center-to-center distance of any two closest beam spots among the N beam spots may be a distance M×Pi.

Figure 5:
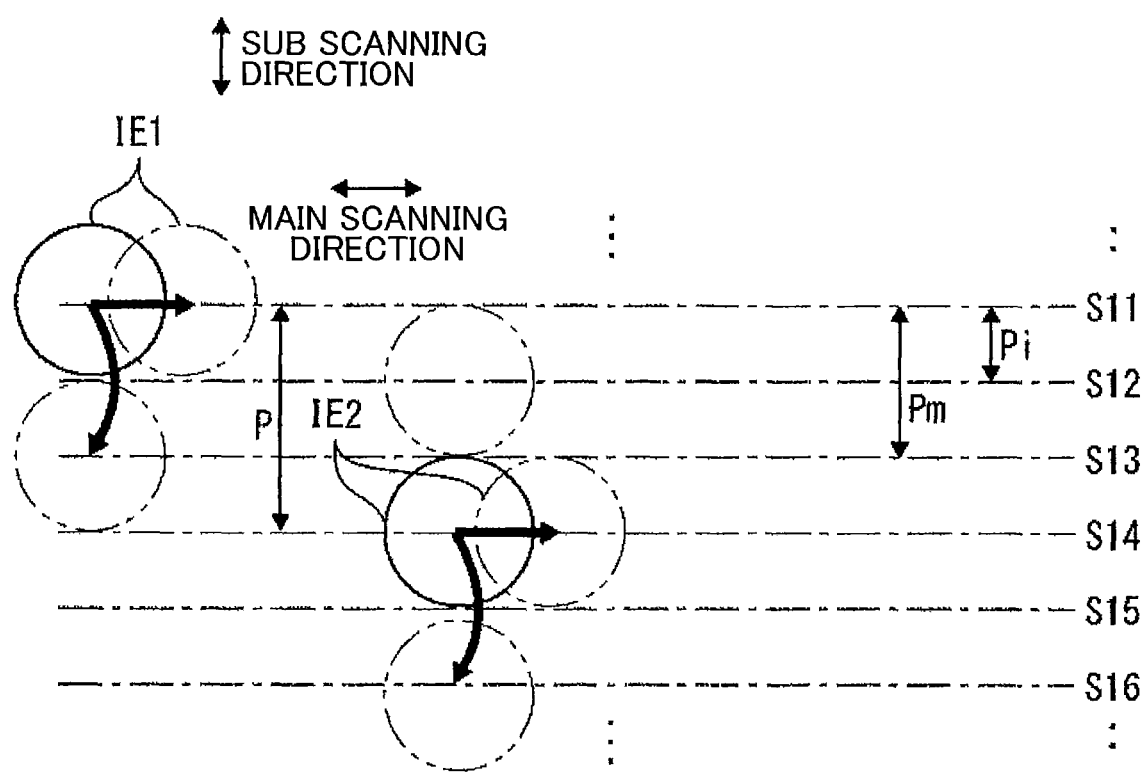
FIG. 5 is an explanatory diagram illustrating interlaced scanning with the scanning optical device shown in FIG. 3.

FIG. 5 illustrates interlaced scanning with the scanning optical device 41 shown in FIG. 3 and how images IE1 and IE2 formed by the respective laser light-emitting members E1 and E2 move over the scanned surface of the photosensitive member 51. As shown in FIG. 5, N scan lines at positions being separated from each other in the sub scanning direction by M scan lines (where N=2 and M=3) are exposed by light emitted from the laser light-emitting members E1 and E2.

In the example of FIG. 5, scan lines S11 and S14 are separated from each other in the sub scanning direction by M scan lines. Here, M denotes the number of intervals Pi between two scan lines S11 and S14. For example, when starting from scan line S11 and counting the number of lines to scan line S14, M denotes the number of scan lines S12-S14 while excluding scan line S11 which is the starting point.

Further, the image IE1 of the laser light-emitting member E1 and the image IE2 of the laser light-emitting member E2 are scanned at a prescribed time in the main scanning direction along the respective scan lines S11 and S14. The distance in the sub scanning direction between the centers of the image IE1 and image IE2 is equivalent to a pitch P of beams irradiated from the semiconductor laser 412M. The pitch P is 3 (=M) times a distance Pi between neighboring scan lines among the scan lines S11, S12, S13, . . . .

In the meantime, the photosensitive member 51 is driven to rotate by a motor (not shown). Each time after the images IE1 and IE2 are scanned once in the main scanning direction, the scanned surface of the photosensitive member 51 scanned by the set of beams is moved a distance Pm in the sub scanning direction. This distance Pm is twice the distance Pi. Hence, after the images IE1 and IE2 are scanned along the scan lines S11 and S14, for example, the images IE1 and IE2 are subsequently scanned along the scan lines S13 and S16, as depicted by one-dot chain lines, shifted two scan lines from the scan lines S11 and S14. At the next timing, the images IE1 and IE2 are then scanned along scan lines S15 and S18 shifted another two lines. The same scanning pattern is repeated thereafter.

As described above, for each scan of the beam group in the present embodiment, beams are scanned along a k-th scan line $S_k$ and a (k+3)-th scan line $S_{k+3}$ in the sub scanning direction (where k is a natural number). In this way, scan lines covering the entire scanned surface of the photosensitive member 51 are sequentially exposed.

The N beams of light emitted from each of the other semiconductor lasers 412K, 412Y, and 412C are similar to the N beams of light emitted from the N laser light-emitting members E1 and E2 in the semiconductor laser 412M. As shown in FIG. 2, the scanning optical system 415 includes scanning optical systems 415M, 415K, 415Y, and 415C.

As shown in FIG. 2, in the scanning optical system 415Y for yellow, light emitted from the semiconductor laser 412Y is converted into a beam by the coupling lens 413L, and the beam is deflected by the polygon mirror 414 to form a beam spot (a spot image) on the photosensitive member 51. The scanning optical system 415Y is provided with a scanning lens 11, a mirror 12 that reflects a beam passing through the upper portion of the scanning lens 11, and a mirror 13 that reflects the beam reflected by the mirror 12 toward the photosensitive member 51.

In the scanning optical system 415Y, the beam passes through the upper portion of the scanning lens 11, is reflected diagonally upward by the mirror 12, is reflected in the negative direction of the Z-axis by the mirror 13, and exits the scanning optical device 41 through the exit window WL2.

In the scanning optical system 415M for magenta, light emitted from the semiconductor laser 412M is converted to a beam by the coupling lens 413L, and the beam is deflected by the polygon mirror 414 to form a beam spot (a spot image) on the corresponding photosensitive member 51. The scanning optical system 415M is disposed between the polygon mirror 414 and the scanning optical system 415Y. The scanning optical system 415M is provided with two mirrors 14 and 15 for reflecting a beam that passes through the lower portion of the scanning lens 11, and a mirror 16 that reflects the beam reflected off the mirror 15 toward the photosensitive member 51.

In the scanning optical system 415M, a beam passing through the lower portion of the scanning lens 11 is reflected upward by the mirror 14, is reflected in the positive direction of the X-axis by the mirror 15, is reflected in the negative direction of the Z-axis by the mirror 16, and exits the scanning optical device 41 through an exit window WL2.

As shown in FIG. 2, the scanning optical systems 415 have left-right symmetry about the polygon mirror 414. Consequently, the structure of the scanning optical system 415C is similar to the structure of the scanning optical system 415M, and the structure of the scanning optical system 415K is similar to the structure of the scanning optical system 415Y.

Structure of the Process Members 42

As shown in FIG. 1, a plurality of the process members 42 is provided to correspond with the plurality of toner colors. In other words, there are four process members 42 that include a yellow process member 42Y, a magenta process member 42M, a cyan process member 42C, and a black process member 42K. The process members 42 are arranged in parallel and are spaced apart from each other in the X-axis direction. Each process member 42 is provided with a photosensitive member 51, a charger 52, and a developing cartridge 53.

The photosensitive member 51 has a cylindrical shape, and the top layer is a positively charged photosensitive layer formed of polycarbonate or the like. The charger 52 may be a positive-charging scorotron charger provided with a wire and grid that produce a corona discharge when a charging bias is applied. The charger 52 is disposed on the positive side of the corresponding photosensitive member 51 along the X-axis and confronts the photosensitive member 51 from a distance without contacting the photosensitive member 51.

The developing cartridge 53 is provided with a developing roller 56, a supply roller 57, and a thickness-regulating blade 58. The upper portion of the housing constituting the developing cartridge 53 forms a toner chamber 55 for accommodating toner in the corresponding color.

During image formation, toner of color accommodated in the toner chamber 55 of each process member 42 is supplied onto the corresponding supply roller 57, which rotates to supply the toner to the corresponding developing roller 56. At this time, the toner is positively tribocharged between the supply roller 57 and the developing roller 56 to which a developing bias is applied. The toner supplied onto the developing roller 56 passes between the thickness-regulating blade 58 and the developing roller 56 as the developing roller 56 rotates, and a thin layer of uniform thickness toner is carried on the developing roller 56.

In the meantime, the charger 52 generates a corona discharge when a charging bias is applied and uniformly charges the surface of the photosensitive member 51 with positive polarity. After the charger 52 has positively and uniformly charged the surface of the photosensitive member 51 as the photosensitive member 51 rotates, the surface of the photosensitive member 51 is exposed to beams exiting the corresponding exit window WL2 formed in the scanning optical device 41. The beams are scanned according to line data described later, forming an electrostatic latent image for each color in accordance with the image to be formed on the sheet S1.

As the photosensitive member 51 rotates further, positively charged toner carried on the surface of the developing roller 56 is brought into contact with the photosensitive member 51 by the rotation of the developing roller 56. At this time, toner is supplied to areas on the surface of the positively charged photosensitive member 51 whose potential was lowered when exposed to the laser beams. The toner develops the latent image on the photosensitive member 51 into a visible image through reverse development, producing a toner image on the surface of the photosensitive member 51 for each color.

The transfer member 43 is disposed in the main casing 2 above the sheet cassette 31 and extends along the X-axis beneath the process members 42. The transfer member 43 is provided with a drive roller 59, a follow roller 60, a conveying belt 61, and transfer rollers 62. The conveying belt 61 is an endless belt member that is wrapped around the drive roller 59 and the follow roller 60. The follow roller 60 rotates along with the rotation of the drive roller 59 as the conveying belt 61 circulates in the direction indicated by arrows A in FIG. 1. The transfer rollers 62 transfer toner from the corresponding photosensitive members 51 onto a sheet S1 being conveyed on the conveying belt 61.

After toner has been transferred onto the sheet S1 by the transfer member 43, the fixing member 44 fixes the toner to the sheet S1. The discharging member 5 is provided with conveying rollers 70, a discharge path 71, discharge rollers 72, and a discharge tray 73. After toner has been fixed to the sheet S1 by the fixing member 44, the conveying rollers 70 convey the sheet S1 onto the discharge path 71.

The upstream end of the discharge path 71 is adjacent to the conveying rollers 70 while the downstream end is adjacent to the discharge rollers 72. The discharge path 71 forms a conveying path along which the sheet S1 is conveyed from the conveying rollers 70 to the discharge rollers 72. The discharge rollers 72 discharge the sheet S1 into the discharge tray 73. The discharge tray 73 is formed on the top surface of the main casing 2 as a sloped surface that slopes downward in the positive direction of the X-axis.

Structure of an ASIC 6

Figure 6:
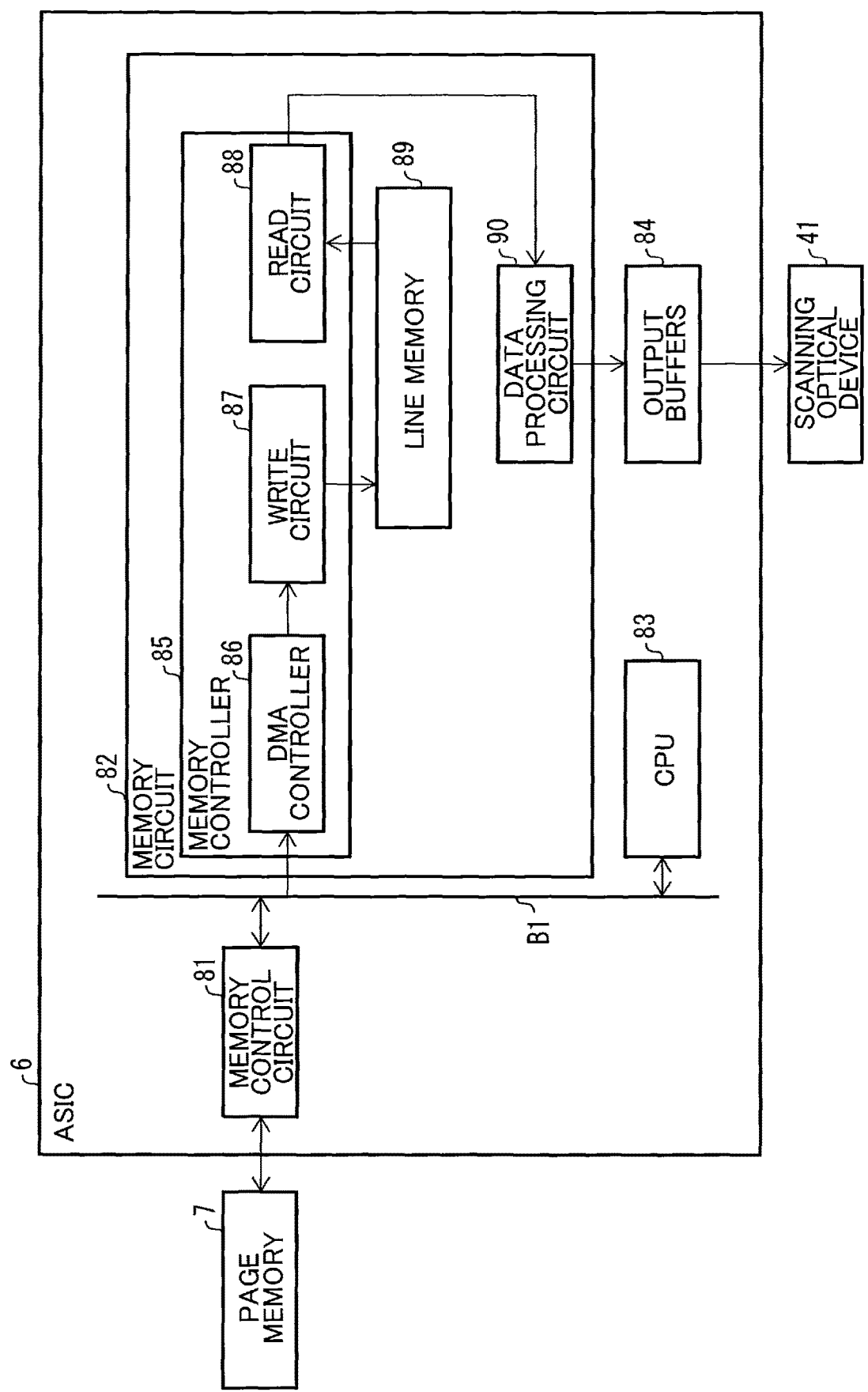
FIG. 6 is a block diagram showing a structure of an ASIC provided in the image forming device shown in FIG. 1.

FIG. 6 is a block diagram showing the structure of an ASIC 6 provided in the image forming device 1 depicted in FIG. 1. As shown in FIG. 6, the image forming device 1 is provided with the ASIC 6 as an example of the integrated circuit, and a page memory 7. The ASIC 6 is provided with a memory control circuit 81, a memory circuit 82, a central processing unit (CPU) 83, N output buffers 84, and an internal bus B1. In other words, the memory control circuit 81, the memory circuit 82, the CPU 83, the N output buffers 84, and the internal bus B1 are provided in the ASIC 6.

The following description will focus on the semiconductor laser 412M among the semiconductor lasers 412M, 412K, 412Y, and 412C. However, the description for the semiconductor laser 412M may also be applied to the other semiconductor lasers 412K, 412Y, and 412C.

The page memory 7 stores raster image data. The image forming device 1 generates this raster image data based on print data that the image forming device 1 received from an external device. The page memory 7 is provided externally to the ASIC 6. The memory control circuit 81 reads raster image data from the page memory 7 and outputs this data via the internal bus B1 to a direct memory access (DMA) controller 86. The internal bus B1 is connected to the memory control circuit 81, the CPU 83, and the DMA controller 86.

The memory circuit 82 is provided with a memory controller 85, a line memory 89, and a data processing circuit 90. In other words, the memory controller 85, the line memory 89, and the data processing circuit 90 are provided in the memory circuit 82. Integrating the line memory 89 and the memory controller 85 in the ASIC 6 can reduce the time required to transfer information between the line memory 89 and the memory controller 85, thereby speeding up processing with the memory controller 85.

The memory controller 85 is provided with the DMA controller 86, a write circuit 87, and a read circuit 88. The DMA controller 86 transfers raster image data outputted from the memory control circuit 81 to the write circuit 87. The write circuit 87 generates a set of line data from the raster image data received from the DMA controller 86 and writes this set of line data to the line memory 89. The set of line data is data for pixels corresponding to a scan line on the photosensitive member 51. The line memory 89 stores this set of line data.

The read circuit 88 reads a set of line data from the line memory 89 and outputs this set of line data to the data processing circuit 90. The data processing circuit 90 stores the set of line data received from the read circuit 88 in the N output buffers 84. The read circuit 88 also outputs sets of line data to the N laser light-emitting members E1 and E2 of the semiconductor laser 412M via the data processing circuit 90 and the N output buffers 84. The N output buffers 84 correspond to the N laser light-emitting members E1 and E2 of the semiconductor laser 412M. The output buffers 84 are first in, first out memory (FIFO), for example.

The page memory 7 is dynamic random-access memory (DRAM), while the line memory 89 is static random-access memory (SRAM), in the embodiment. By configuring the line memory 89 of SRAM, which performs storage processes more quickly than DRAM, the process for storing sets of line data in the line memory 89 can be completed within a single scan.

As shown in FIG. 3, the BD sensor 8 is positioned so that a beam reflected off the beam deflecting surfaces 414S is incident on the BD sensor 8 in a state that the beam deflecting surfaces 414S forms a prescribed angle relative to the irradiated direction of the beam before exposure is performed according to the set of line data. The BD sensor 8 detects the beam deflected by the polygon mirror 414. The BD sensor 8 outputs a detection signal to the DMA controller 86 that is a low level at timings in which a beam is not incident on the BD sensor 8 and a high level at timings in which a beam is incident on the BD sensor 8. The DMA controller 86 transfers detection signals outputted from the BD sensor 8 to the write circuit 87.

Process of the Memory Controller 85

FIG. 7 shows the process performed by the memory controller 85 provided in the ASIC 6 of FIG. 6. A1-A12 on the left side of the table in FIG. 7 denote addresses in the line memory 89. Every pair of columns to the right of the addresses indicate a process for one scan. In the pair of columns, left side column is for explaining a writing process and right side column is for explaining a reading process. The line memory 89 is assumed to include addresses A1-A12 and storage areas identified by the addresses A1-A12 in this example. In the process of the memory controller 85, the addresses A1-A12 are periodically used, and thus the address A1 is treated as the address following the address A12 in the line memory 89. A memory area identified by each of the addresses A1-A12 stores a set of line data.

Further, the process of the memory controller 85 described in FIG. 7 assumes that N=2 and M=3, where N is the number of laser light-emitting members E1 and E2 in the semiconductor laser 412M, and M is the number of lines that separate scan lines along which closest beam spots are scanned on the photosensitive member 51 at a time. Sets of line data stored in the addresses A1-A10 are assumed to be sets of line data for ten neighboring scan lines on the photosensitive member 51. In this description, neighboring scan lines indicate scan lines corresponding to lines arranged successively in the raster image data (print data), and thus are scan lines successively arranged at the regular interval Pi on the photosensitive member 51. Each set of line data is generated on the basis of the raster image data. Sets of line data for neighboring ten scan lines next to the current ten scan lines are overwritten in the storage areas identified by the addresses A1-A10 when performing subsequent operations (subsequent scans). The storage areas of the addresses A11 and A12 are supplementary areas to consistently achieve six cycles shown in FIG. 7. Scanning on the photosensitive member 51 is not performed by using the sets of line data stored in the storage areas of the addresses A11 and A12. The successive addresses of the line memory 89 correspond to respective ones of successive scan lines on the photosensitive member 51. Since scanning is not performed based on the sets of data at the addresses A11 and A12, the addresses A11 and A12 correspond to no scan lines on the photosensitive member 51 essentially. In this example, for one scan, the write circuit 87 writes N (=2) sets of line data for N neighboring scan lines in the line memory 89 at a time from the page memory 7. This writing of sets of line data is performed in a sequential order in which lines are arranged in the raster image data. On the other hand, the read circuit 88 repeatedly reads N (=2) sets of line data for N scan lines separated by M (=3) scan lines from the line memory 89 to the N output buffers 84. For example, two sets of line data separated for the two scan lines separated by 3 (=M) scan lines are stored in two storage areas identified by two addresses separated by 3 (=M) addresses in the line memory 89. In this case, the order of reading is such that the read circuit 88 reads next N sets of line data for scan lines sifted by Pm from the present pair of N scan lines. Prior to the image forming device 1 performing a printing process on the sheet S1, the write circuit 87 initializes the line memory 89, i.e., sets of all line data in the line memory 89 to blank data.

For each cycle of the detection signal outputted by the BD sensor 8, the memory controller 85 executes the following process for one scan. That is, the memory controller 85 begins the process for one scan described below after the write circuit 87 recognizes that the detection signal from the BD sensor 8 is the high level.

As shown in FIG. 7, in the first scan the write circuit 87 executes a process W1 to write two sets of line data from the page memory 7 for N neighboring two scan lines on the photosensitive member 51 to the storage areas identified by N neighboring (successive) addresses A3 and A4 in the line memory 89. Further, the read circuit 88 selects the addresses A11 and A2 from the line memory 89 storing two sets of line data for N scan lines on the photosensitive member 51 that are separated from each other by M scan lines.

Further, the read circuit 88 executes a process R1 to output two sets of line data read from the storage areas identified by selected addresses A11 and A2 to the N laser light-emitting members E1 and E2 of the semiconductor laser 412M. The addresses A11 and A2 are separated in the line memory 89 by M lines' worth of addresses, with address A11 serving as the starting point. That is, since the addresses are used cyclically and thus the address A1 follows the address A12, the difference between the address A2 and A11 is essentially 3 (=M). The storage areas identified by address A2 stores a set of line data written by the write circuit 87 in the scan prior to the first scan, while the address A11 stores blank data. Consequently, the scanning optical device 41 scans the line on the photosensitive member 51 corresponding to the address A2 but does not scan the line on the photosensitive member 51 corresponding to the address A11.

In the process R1, the read circuit 88 writes two sets of line data corresponding to N scan lines read from the storage areas identified by selected addresses A11 and A2 to the N output buffers 84 through the data processing circuit 90. The scanning optical device 41 reads the sets of line data from the N output buffers 84 and outputs these sets of line data to the N laser light-emitting members E1 and E2 of the semiconductor laser 412M. Configuring the read circuit 88 to write sets of line data to the output buffers 84 enables the scanning optical device 41 to expose the photosensitive member 51 in synchronization with the detection signal from the BD sensor 8.

The detection signal from the BD sensor 8 switches to the low level after the first scan has been started. When the detection signal returns again to high level, the memory controller 85 begins the second scan. In the second scan, the write circuit 87 executes a process W2 to write two sets of line data from the page memory 7 for N neighboring scan lines on the photosensitive member 51 to the storage areas identified by N neighboring addresses A5 and A6 in the line memory 89. The write circuit 87 selects the addresses A5 and A6 as the N neighboring addresses chronologically (successively) following the addresses A3 and A4 for which the process W1 was executed in the first scan. The N neighboring scan lines for which the sets of line data are read from the page memory 7 during the second scan are successive scan lines from the N neighboring scan lines for which the sets of line data are read from the page memory 7 during the first scan.

In addition, the read circuit 88 selects the addresses A1 and A4 from the line memory 89 storing sets of line data for N scan lines on the photosensitive member 51 that are separated from each other by M scan lines. That is, the difference between the number "4" of the address "A4" and the number "1" of the address "A1" is "3 (=M)". The write circuit 87 selects the address A1 as the address that comes later chronologically (successively) from among the addresses A12 and A1 which are between the addresses A11 and A2 selected for the first scan. Further, using the selected address A1 as the starting point, the write circuit 87 selects the address A4 separated by M lines' worth of addresses from the address A1.

Next, the read circuit 88 executes a process R2 for outputting sets of line data read from the storage area identified by the selected addresses A1 and A4 to the N laser light-emitting members E1 and E2 of the semiconductor laser 412M via the output buffers 84. The storage area identified by the address A1 stores a set of line data written by the write circuit 87 in the scan prior to the first scan, and the storage area identified by the address A4 stores a set of line data written by the write circuit 87 in the process W1 of the first scan. Hence, the scanning optical device 41 scans a line on the photosensitive member 51 that corresponds to the address A1 and scans a line on the photosensitive member 51 that corresponds to the address A4.

In the third and subsequent scans, the write circuit 87 executes processes W3-W6 and the read circuit 88 executes processes R3-R6 in the same manner as the first and second scans. Through processes R1-R6, the scanning optical device 41 scans ten neighboring lines on the photosensitive member 51 corresponding to the addresses A1-A10.

Note that in the process W5, the write circuit 87 writes blank data in the storage areas identified by the addresses A11 and A12. In this case, in the process W6 the write circuit 87 writes two sets of line data for two neighboring scan lines successive from the two neighboring scan lines related to the two sets of line data stored in the storage areas of the addresses A9 and A10 in the process W4. Alternatively, both the processes W5 and W6 may store the same two sets of line data for two neighboring scan lines successive from the two neighboring scan lines related to the two sets of line data stored in the storage areas of the addresses A11 and A12 in the process W4. In this case, the data processing circuit 90 sets the set of line data read by the read circuit 88 from the addresses A11 and A12 to zero in the processes R1 and R6 so that the scanning optical device 41 does not scan a line on the photosensitive member 51 corresponding to the addresses A1 and A12. Thus, the addresses A11 and A12 are not subject to scanning by the scanning optical device 41.

When performing interlaced scanning as described above, the image forming device 1 selects addresses in the line memory 89 storing sets of line data for N scan lines separated from each other by M scan lines. Accordingly, the image forming device 1 can efficiently expose the photosensitive member 51 in one scan based on sets of line data for N scan lines by not reading from the line memory 89 sets of line data that are not to be outputted to the laser light-emitting members E1 and E2. In other words, the image forming device 1 can reduce access time to the page memory 7 compared to a device that reads sets of line data from the line memory 89 while discarding unnecessary data from the sets of line data until necessary data is obtained.

Second Embodiment

Next, a second embodiment of the present disclosure will be described. FIG. 8 illustrates the process of the memory controller 85 provided in the image forming device 1 according to the second embodiment. In the second embodiment, the content of the processes executed by the memory controller 85 and the data processing circuit 90 differs from those in the first embodiments.

A1-A16 on the left side of the table in FIG. 8 denote addresses in the line memory 89. Every pair of columns to the right of the addresses indicates the process for one scan. The line memory 89 is assumed to include addresses A1-A16 and their storage areas. In the process of the memory controller 85, the address A1 is treated as the address following the address A16 in the line memory 89.

Further, the process of the memory controller 85 described in FIG. 8 assumes that N=2 and M=3. Sets of line data stored in the storage areas identified by the addresses A1-A12 are assumed to be sets of line data for six neighboring scan lines on the photosensitive member 51. In other words, one scan line on the photosensitive member 51 corresponds to two addresses in the line memory 89. A set of line data for one full-line is divided into two sets of line data (partial data) from the raster image data, and the divided two sets of line data are stored in the storage areas identified by two successive addresses. Scanning on the photosensitive member 51 is not performed by using sets of line data stored in the storage areas of the addresses A13-A16.

As shown in FIG. 8, in the first scan the write circuit 87 executes a process W1 to write sets of line data from the page memory 7 for N neighboring scan lines on the photosensitive member 51 to storage areas identified by 2N neighboring addresses A5-A8 in the line memory 89. Here, the addresses A5 and A6 correspond to one of the N neighboring scan lines on the photosensitive member 51 and the addresses A7 and A8 correspond to the other of the N neighboring scan lines on the photosensitive member 51.

Further, the read circuit 88 selects the addresses A13, A14, A3, and A4 from the line memory 89 storing sets of line data for N scan lines on the photosensitive member 51 that are separated from each other by M scan lines. Next, the read circuit 88 executes a process R1 to output sets of line data read from the storage areas identified by the selected addresses A13, A14, A3, and A4 to the laser light-emitting members E1 and E2 of the semiconductor laser 412M via the output buffers 84.

In other words, the read circuit 88 outputs the sets of line data read from the storage areas identified by the addresses A13 and A14 to the laser light-emitting member E1 of the semiconductor laser 412M via the output buffers 84. Similarly, the read circuit 88 outputs the sets of line data read from the storage areas identified by the addresses A3 and A4 to the laser light-emitting member E2 of the semiconductor laser 412M via the output buffers 84.

More specifically, the read circuit 88 outputs the sets of line data read from the storage areas identified by the addresses A13 and A14 to the data processing circuit 90. The data processing circuit 90 converts the sets of line data from the storage areas identified by the addresses A13 and A14 outputted from the read circuit 88 to a set of line data for one scan line. That is, the data processing circuit 90 converts the sets of line data stored in storage areas identified by a plurality of neighboring addresses in the line memory 89 selected by the read circuit 88 to a set of (full) line data for a single scan line. The data processing circuit 90 outputs the converted set of line data to the laser light-emitting member E1 of the semiconductor laser 412M via the output buffers 84.

Additionally, the read circuit 88 outputs sets of line data read from the storage areas identified by the addresses A3 and A4 to the data processing circuit 90. The data processing circuit 90 converts the sets of line data from the storage areas identified by the addresses A3 and A4 outputted from the read circuit 88 to a set of (full) line data for a single scan line. The data processing circuit 90 outputs the converted set of line data to the laser light-emitting member E2 of the semiconductor laser 412M via the output buffers 84.

The addresses A13 and A3 are separated from each other in the line memory 89 by 2M addresses, which correspond to M neighboring scan lines on the photosensitive member 51, with the address A13 serving as the starting point. The addresses A3 and A4 identifies the storage areas for storing sets of line data written by the write circuit 87 in a single scan prior to the first scan, while the storage areas identified by the addresses A13 and A14 store blank data. Consequently, the scanning optical device 41 scans the lines on the photosensitive member 51 corresponding to the addresses A3 and A4 but does not scan the lines on the photosensitive member 51 corresponding to addresses A13 and A14.

The detection signal from the BD sensor 8 switches to the low level after the first scan has been started. When the detection signal returns again to high level, the memory controller 85 begins the second scan. In the second scan, the write circuit 87 executes a process W2 to write sets of line data from the page memory 7 for N neighboring scan lines on the photosensitive member 51 to the storage areas identified by the 2N neighboring addresses A9-A12 in the line memory 89. The write circuit 87 selects the addresses A9-A12 as the 2N neighboring addresses chronologically (successively) following the addresses A5-A8 for which the process W1 was executed in the first scan. The N neighboring scan lines for which the sets of line data are read from the page memory 7 during the second scan are successive scan lines from the N neighboring scan lines for which the sets of line data for are read from the page memory 7 during the first scan.

In addition, the read circuit 88 selects the addresses A1, A2, A7, and A8 from the line memory 89 storing sets of line data for N scan lines on the photosensitive member 51 that are separated from each other by M scan lines. Next, the read circuit 88 executes a process R2 for outputting sets of line data read from the storage areas identified by the selected addresses A1, A2, A7, and A8 to the laser light-emitting members E1 and E2 of the semiconductor laser 412M.

More specifically, the read circuit 88 outputs the sets line data read from the storage areas identified by the addresses A1 and A2 to the data processing circuit 90. The data processing circuit 90 then converts the sets of line data from the storage areas identified by the addresses A1 and A2 outputted from the read circuit 88 to a set of (full) line data for a single scan line. The read circuit 88 similarly outputs the set of line data read from the storage areas identified by the addresses A7 and A8 to the data processing circuit 90. The data processing circuit 90 converts the sets of line data from the storage areas identified by the addresses A7 and A8 outputted from the read circuit 88 to a set of (full) line data for a single scan line.

The storage areas identified by the addresses A1 and A2 store the sets of line data written by the write circuit 87 in the scan prior to the first scan, and the storage areas identified by the addresses A7 and A8 store the sets of line data written by the write circuit 87 in process W1 of the first scan. Hence, the scanning optical device 41 scans lines on the photosensitive member 51 corresponding to the addresses A1, A2, A7, and A8.

In the third and subsequent scans, the write circuit 87 executes processes W3 and W4 and the read circuit 88 executes processes R3 and R4 in the same manner as the first and second scans. Through processes R1-R4, the scanning optical device 41 scans six neighboring scan lines on the photosensitive member 51 corresponding to addresses A1-A12.

Note that in the process W3, the write circuit 87 writes blank data in the storage areas identified by the addresses A13-A16. In this case, in the process W4 the write circuit 87 writes two sets of line data for two neighboring scan lines successive from the two neighboring scan lines related to the two sets of line data stored in the storage areas of the addresses A9-A12 in the process W2. Alternatively, both the processes W3 and W4 may store the same two sets of line data for two neighboring scan lines successive from the two neighboring scan lines related to the two sets of line data stored in the storage areas of the addresses A9-A12 in the process W2. In this case, the data processing circuit 90 sets the set of line data read by the read circuit 88 from the storage areas identified by the addresses A13 and A14 in the process R1 to zero so that the scanning optical device 41 does not scan a line on the photosensitive member 51 corresponding to the addresses A13 and A14. Similarly, the data processing circuit 90 sets the set of line data read by the read circuit 88 from the storage areas identified by the addresses A15 and A16 in the process R4 to zero. Thus, the addresses A13-A16 are not subject to scanning by the scanning optical device 41.

Further, by converting sets of line data for a plurality of lines to a set of line data for a single scan line as described above, the data processing circuit 90 performs the following process. As a specific example, the page memory 7 may store 1200×1200 dpi raster image data (resolution in main scanning direction x resolution in sub scanning direction; the same applies hereafter). In this case, the data processing circuit 90 converts the 1200×1200 dpi data to 2400×600 dpi or 4800×600 dpi data. This enables the scanning optical device 41 to expose the photosensitive member 51 based on data corresponding to 1200×1200 dpi, even when the exposure resolution of the scanning optical device 41 is 600 dpi in the sub scanning direction.

Through the above process, the image forming device 1 according to the second embodiment converts the sets of line data for a plurality of lines stored in storage areas identified by a plurality of neighboring addresses in the line memory 89 to the sets of line data for a single scan line.

Third Embodiment

Next, a third embodiment of the present disclosure will be described. FIG. 9 illustrates the process of the memory controller 85 provided in the image forming device 1 according to the third embodiment. In the third embodiment, the content of the processes executed by the memory controller 85 and the data processing circuit 90 differs from that in the first and second embodiments.

A1-A11 on the left side of the table in FIG. 9 denote addresses in the line memory 89. Every pairs of columns to the right of the addresses indicates a process for one scan. The line memory 89 is assumed to include the addresses A1-A11 and their storage areas. In the process of the memory controller 85, the address A1 is treated as the address following the address A11 in the line memory 89. Further, the process of the memory controller 85 described with reference to FIG. 9 assumes that N=2 and M=3. Sets of line data stored in the storage areas identified by the addresses A1-A10 are assumed to be sets of line data for ten neighboring scan lines on the photosensitive member 51.

As shown in FIG. 9, in the first scan the write circuit 87 executes a process W1 to write sets of line data from the page memory 7 for N neighboring scan lines on the photosensitive member 51 to the N neighboring addresses A1 and A2 in the line memory 89. Further, the read circuit 88 selects the addresses A5-A10 from the line memory 89 storing sets of line data which are to be used for N scan lines on the photosensitive member 51. Here, the read circuit 88 selects the addresses A6 and A9 separated from each other by M addresses, and selects the addresses A5 and A7 neighboring the firstly selected address A6 and also selects addresses A8 and A10 neighboring the firstly selected address A9, thereby selecting the addresses A5-A10. In the following processes, the sets of line data stored in the storage areas identified by the addresses A6 and A9 are used for scanning lines on the photosensitive member 51 after the sets of line data stored in the storage areas identified by the addresses A6 and A9 are corrected by referencing the sets of line data stored in the storage areas identified by the addresses A5, A7, A8, and A10. Subsequently, the read circuit 88 executes a process R1 to output line data read from the selected addresses A5-A10 to the N laser light-emitting members E1 and E2 of the semiconductor laser 412M via the output buffers 84.

Specifically, the read circuit 88 outputs sets of line data read from the storage areas identified by the selected addresses A5-A10 to the data processing circuit 90. The data processing circuit 90 sets the set of line data in the storage area identified by the address A6 as the data to be corrected among the sets of line data in addresses A5-A7 outputted from the read circuit 88.

The data processing circuit 90 references the sets of line data stored in the storage areas identified by the addresses A5 and A7 neighboring the address A6 at which the set of line data as the data to be corrected is stored in the memory 89. Based on the referenced line data in the storage areas identified by the addresses A5 and A7, the data processing circuit 90 corrects the set of line data in the storage area identified by the address A6 to generate a set of line data for one scan line. The data processing circuit 90 outputs this generated set of line data to the laser light-emitting member E1 of the semiconductor laser 412M for scanning a scan line corresponding to the address A6 via the output buffer 84.

The data processing circuit 90 similarly sets the set of line data in the storage area identified by the address A9 as the data to be corrected among the sets of line data in the storage areas identified by the addresses A8-A10 outputted from the read circuit 88. The data processing circuit 90 references the sets of line data stored in the storage areas identified by the addresses A8 and A10 neighboring the address A9 at which the set of line data as the data to be corrected is stored in the line memory 89.

Based on the sets of line data referenced in the storage areas identified by the addresses A8 and A10, the data processing circuit 90 corrects the set of line data in the storage area identified by the address A9 to generate a set of line data for one scan line. The data processing circuit 90 outputs the generated set of line data to the laser light-emitting member E2 of the semiconductor laser 412M for scanning a scan line corresponding to the address A9 via the output buffer 84. Here, the addresses A6 and A9, which have been targeted for correction, are separated from each other in the line memory 89 by M lines' worth of addresses.

The detection signal from the BD sensor 8 switches to the low level after the first scan has been started. When the detection signal returns again to high level, the memory controller 85 begins the process for the second scan. In the second scan, the write circuit 87 executes a process W2 to write sets of line data from the page memory 7 for N neighboring scan lines on the photosensitive member 51 to the storage areas identified by the N neighboring addresses A3 and A4 in the line memory 89. The write circuit 87 selects the addresses A3 and A4 as the N neighboring addresses chronologically (successively) following addresses A1 and A2 for which the process W1 was executed in the first scan. The N neighboring scan lines for which the sets of line data are read from the page memory 7 during the second scan are successive scan lines from the N neighboring scan lines for which the sets of line data for are read from the page memory 7 during the first scan.

In addition, the read circuit 88 selects the addresses A7-A11 and A1 from the line memory 89 storing sets of line data for N scan lines on the photosensitive member 51. Here, the selected addresses A7-A11 and A1 includes the addresses A8 and A11 separated by M scan lines' worth of addresses. The write circuit 87 selects the address A8 as the address at which the set of line data to be corrected is stored. The write circuit 87 further selects the addresses A7 and A9 neighboring the address A8 as addresses at which sets of line data, as the reference data, are stored.

Additionally, the write circuit 87 selects the address A11 at which the set of line data to be corrected is stored and selects the addresses A10 and A1 at which sets of line data as reference data are stored. Next, the read circuit 88 executes a process R2 to output the sets of line data read from the selected addresses A7-A11 and A1 to the N laser light-emitting members E1 and E2 of the semiconductor laser 412M via thee output buffers 84.

Specifically, the read circuit 88 outputs the sets of line data read from the storage areas identified by the selected addresses A7-A11 and A1 to the data processing circuit 90. The data processing circuit 90 then sets the set of line data in the storage area identified by the address A8 as data to be corrected among the line data in addresses A7-A9 outputted from the read circuit 88. Further, the data processing circuit 90 sets the set of line data in the storage area identified by the address A11 as data to be corrected among the line data in the addresses A10, A11, and A1 outputted from the read circuit 88. Similarly to the first scan, the data processing circuit 90 corrects the sets of line data set as the data to be corrected, and outputs the corrected sets of line data for scanning scan lines corresponding to the addresses A8 and A11.

In the third and subsequent scans, the write circuit 87 executes processes W3-W8 and the read circuit 88 executes processes R3-R8 in the same manner as the first and second scans. Through processes R1-R8, the scanning optical device 41 scans ten neighboring scan lines on the photosensitive member 51 corresponding to address A1-A10. Note that the data processing circuit 90 sets the sets of line data read by the read circuit 88 from the addresses A11, A1, and A2 to zero in the process R8 so that the scanning optical device 41 does not scan lines on the photosensitive member 51 corresponding to the addresses A11, A1, and A2.

As described above, the data processing circuit 90 sets at least one set of line data stored in at least one storage area identified by at least one of a plurality of neighboring addresses in the line memory 89 that were selected by the memory controller 85 as data to be corrected. The data processing circuit 90 also reference sets of line data stored in addresses in the line memory 89 that neighbor the address at which the set of line data to be corrected is stored. Further, the data processing circuit 90 corrects the at least one set of line data to be corrected based on the referenced sets of line data to generate at least one set of line data for one scan line.

By correcting the set of line data to be corrected based on sets of line data stored in neighboring other addresses in this way, the data processing circuit 90 generates at least one set of line data for one scan line. This process can produce sharper pixel data in each set of line data for one scan line.

Example of Software Implementation

The functions of the image forming device 1 may be implemented by a program that controls a computer to function as the image forming device 1 and that controls the computer to function as each control block of the image forming device 1 (and particularly each unit in the ASIC 6).

In this case, the image forming device 1 is provided with a computer possessing at least one control device (e.g., processor) and at least one storage (e.g., memory) as the hardware required for executing the program. Each function described in the above embodiments is implemented by executing the program using this control device and the storage.

The program may be permanently recorded on one or a plurality of computer-readable storage media. The storage media may be provided in the image forming device 1 but need not be. In the latter case, the program may be provided to the image forming device 1 through any wired or wireless transmission medium. In addition to this, the functions of each control block may be implemented by a quantum computer, for example.

Each process described in the above embodiments may be executed through artificial intelligence (AI). In this case, the AI may be a process running on the control device or a process running on another device, such as an edge computer or cloud server.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image forming apparatus, comprising:
a photosensitive drum;
a semiconductor laser having N laser emitters, N being a natural number larger than or equal to two;
an incident optical system configured to convert light emitted from each laser emitter to a beam;
a polygon mirror configured to deflect and cyclically scan each beam from the incident optical system;
a scanning optical system configured to form on the photosensitive drum N beam spots by N beams deflected by the polygon mirror, each beam spot scanning along a scan line on the photosensitive drum to form a beam image along the scan line for one cycle, any neighboring two beam spots in the N beam spots having centers with a center-to-center distance of the neighboring two beam spots separated by M scan lines, M being a natural number larger than or equal to two;
an optical sensor configured to detect a beam which is deflected to output a detection signal for each cycle;
a page memory configured to store raster image data including a plurality of sets of line data;
a line memory configured to store the sets of line data read from the page memory, the line memory having storage areas and addresses identifying respective ones of the storage areas; and
a memory controller configured to perform:
for each cycle based on the detection signal outputted from the optical sensor,
reading adjacent sets of line data for scan lines from the page memory, the adjacent sets of line data for scan line successively arranged on the photosensitive drum;
writing the adjacent sets of line data for scan lines to the storage areas identified by a plurality of successive addresses among the addresses of the line memory;
selecting addresses identifying storage areas storing unadjacent sets of line data for N scan lines having non-successive two scan lines separated by M scan lines on the photosensitive drum; and
outputting the unadjacent sets of line data stored in the storage areas identified by the selected addresses to the N laser emitters.

2. The image forming apparatus according to claim 1, wherein the page memory includes a dynamic random access memory, and the line memory includes a static random access memory.

3. The image forming apparatus according to claim 1, further comprising:
N output buffers corresponding to respective ones of the N laser emitters,
wherein the memory controller is configured to perform:
writing the unadjacent sets of line data read from the storage areas identified by the selected addresses in the N output buffers.

4. The image forming apparatus according to claim 1, further comprising:
a data processing circuit configured to convert two or more datasets from the adjacent sets of line data stored in storage areas of successive addresses in the line memory to a set of line data for one scan line.

5. The image forming apparatus according to claim 1, wherein the memory controller is configured to further perform:
setting at least one dataset from the adjacent sets of line data stored in storage areas identified by successive addresses in the line memory as data subject to correction;
referencing one or more datasets from the adjacent sets of line data stored in one or more storage areas identified by one or more addresses adjacent to an address identifying a storage area storing the data subject to correction; and
correcting the data subject to correction based on the referenced one or more datasets to generate a set of line data for one scan line.

6. The image forming apparatus according to claim 1, further comprising an integrated circuit in which the line memory and the memory controller are provided,
wherein the page memory is provided externally to the integrated circuit.

7. The image forming apparatus according to claim 1, wherein neighboring two scan lines on the photosensitive drum is separated by a predetermined distance,
wherein N is two, M is three, and the center-to-center distance of each pair of neighboring two beam spots among the N beam spots is separated by three times as long as the predetermined distance.

* * * * *